Sept. 7, 1954 E. J. GLAISHER 2,688,692

VIDEO DETECTOR CIRCUIT FOR TELEVISION

Filed Dec. 22, 1950

INVENTOR.
EDWARD JAMES GLAISHER
BY Fred M. Vogel
AGENT.

Patented Sept. 7, 1954 2,688,692

UNITED STATES PATENT OFFICE 2,688,692

VIDEO DETECTOR CIRCUIT FOR TELEVISION

Edward James Glaisher, London, England, assignor to Hartford National Bank and Trust Company, Hartford, Conn., as trustee Application December 22, 1950, Serial No. 202,233

Claims priority, application Great Britain February 14, 1950

4 Claims. (Cl. 250—27)

The invention relates to television receiver video detector circuits employing a thermionic diode as a detector followed by a thermionic valve acting as an amplifier of the video frequencies.

In one known circuit for the detection and amplification of amplitude modulated vision signals the output of a diode detector is fed to the control grid of the following video amplifying valve through a H. F. choke and a similar choke is provided in the output load from the anode of the video amplifier valve. These chokes serve to correct the frequency responses of the video frequency circuits and to attenuate the carrier frequency, that is, the received radio frequency in the case of a "straight" R. F. receiver, or the intermediate frequency (I. F.) in the case of a "superhet" receiver.

With this type of circuit difficulty may be experienced if the gain of the video amplifier valve is high due to coupling between the input and output circuits of the amplifier. This coupling causes an undesirable frequency response and might in certain cases cause oscillation. The effect of this coupling may be very greatly reduced if only one choke is used, namely the coupling choke between the detector and amplifier, but unless this choke is of a special design insufficient attenuation of the H. F. or I. F. signal is obtained. This is particularly the case with a superhet receiver with an intermediate frequency of not many times the maximum video frequency. The object of the invention is to overcome these difficulties by arrangement of the circuit so that only one choke of normal and simple design is required.

According to the invention a television receiver detector and video amplifier circuit of the kind above referred to comprises an inductor or coil across which the amplitude modulated R. F. (or I. F.) video signal appears for supply to the diode for demodulation of the video signal, the inductor or coil having an "earthed" tapping dividing the coil into two portions such that the ratio of the turns of the portions is substantially equal to the ratio of the internal anode/cathode capacitance of the diode to the capacitance of a capacitor connecting one end of the coil to the diode cathode, the other end of the coil being connected to the diode anode, whereby the R. F. (or I. F.) voltage between "earth" and the diode cathode is substantially zero. The combined capacitance of the internal diode capacitance and the external capacitor is preferably such as to tune the inductor or coil to resonance at the R. F. (or I. F.) frequency and a direct current path for the diode is provided by a resistor connected across the capacitor or between earth and the diode cathode.

The invention will be more clearly understood from the following description which is given by way of example only and with reference to the accompanying drawings in which.

Figure 1:
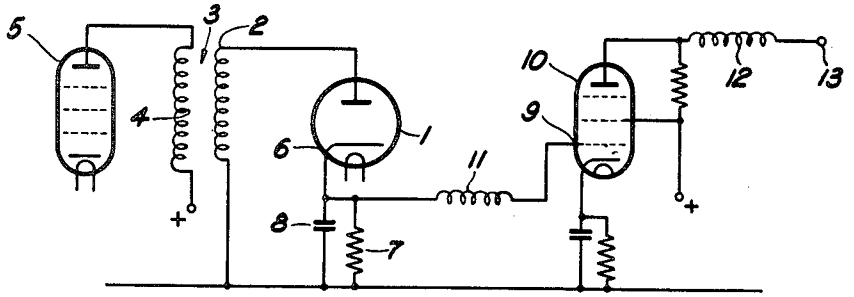
Figure 1 shows a circuit diagram of a known video detector and amplifier arrangement.

Referring now to Figure 1 which shows a known and commonly used detector and video amplifier circuit for television receivers, the diode 1 has an anode connected to one end of coil 2 forming the secondary of an R. F. transformer 3, the primary winding 4 of which is included in the output circuit of the last R. F. (or I. F. in the case of superhet receivers) amplifying valve 5. The other end of the coil 2 is connected to earth. The primary and secondary windings 2 and 4 may either be tightly coupled to act as a single tuned circuit or may be loosely coupled to act as a bandpass circuit. The cathode 6 of the diode is connected through a load resistor 7 to earth to provide a D. C. path and a capacitor 8 is shunted across the resistor.

The diode cathode 6 is connected to the control grid 9 of the video amplifying valve 10 through a video choke 11. The output circuit of the valve 10 includes a further video choke 12 between the anode of the valve and the output terminal 13. These chokes 11 and 12 serve to attenuate the H. F. (or I. F.) frequencies before the output terminals 13 and they also provide a correction for the frequency response of the video frequency circuits.

When the gain of the video amplifier valve 10 is high difficulty may be experienced due to coupling between the input and output circuits. This coupling may cause an undesired frequency response characteristic and may in severe cases cause oscillation. The effect of the coupling is greatly reduced if only one choke is used (for example choke 11) but in this case unless the choke is of special design insufficient attenuation of the I. F. or H. F. frequencies is obtained.

Figure 2:
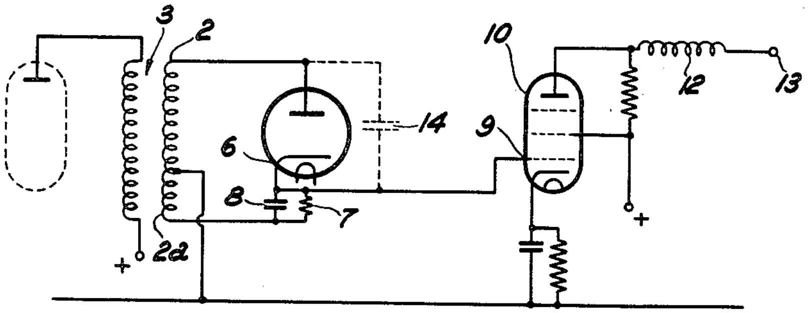
Figure 2 is a circuit diagram of an arrangement according to the invention.

In order to remove the above disadvantage the circuit shown in Figure 2 is employed according to the invention. In this figure the secondary winding 2 of the transformer 3 is modified by the addition of a small winding 2a at its "earthy" end. The load resistor 7 with its shunted capacitor 8 is returned to the end of the additional winding. The diode cathode 6 is connected directly to the control grid 9 and a normal H. F. choke of simple design 12 is included in the output circuit as before.

In Figure 2 the internal anode cathode capacitance of the diode is represented by the capacitor 14 shown dotted in the drawing and it is this capacitance together with the diode conduction current which causes the H. F. (or I. F.) voltage to appear across the R. C. network 7, 8 in Figure 1. Referring again to Figure 2 if the number of turns of the winding 2 between the anode end thereof and the junction with the additional winding is termed N. 1 and the number of turns of the addition winding N. 2 then the H. F. or I. F. voltage at the control grid 9 of the video amplifier 10 may be made approximately zero by adjusting N. 1 and N. 2, so that the ratio is substantially equal to the ratio of the capacitance 8 and 14.

In a type actual circuit the values may be as follows:

| | |
|---|---|
| N. 1 | 40 turns |
| N. 2 | 10 turns |
| Capacitor 8 | 8 pf. |
| Capacitance 14 | Approximately 2 pf. |
| Resistor 7 | 5,000 ohms. |

Figure 3:
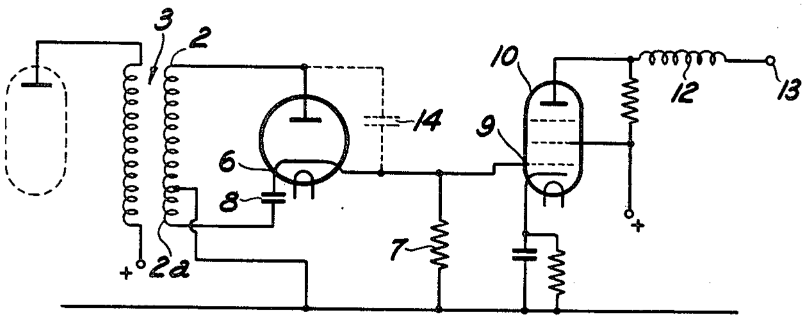
Figure 3 is a modified circuit according to the invention.

A modification of the above described circuit is shown in Figure 3. The modification consists in connecting the diode load resistor 7 between the diode cathode and "earth" instead of across the capacitor 8 as shown in Figure 2. In this case the R. F. (or I. F.) voltage appearing at the control grid 9 cannot be so nearly adjusted to zero but sufficient attenuation may be obtained for all practical purposes.

It will be clear from the foregoing that the invention avoids the feedback difficulties associated with two chokes as shown in Figure 1, and at the same time gives adequate attenuation of the undesired R. F. (or I. F.) voltages. Also the component cost is reduced since one choke only of normal design is required.

What I claim is:

1. In a television receiver wherein an amplitude modulated video signal is derived and which includes a video amplifier, a detector comprising a diode having a cathode and an anode, a multi-turn inductor, means to apply across the inductor the amplitude-modulated video signal having a carrier component, a capacitor connecting one end of said inductor to said cathode, the other end being connected to said anode, means to connect a point on said inductor to ground, said point occupying a position at which the ratio of the turns on either side thereof is substantially equal to the ratio of the inter-electrode capacitance of said diode to the capacitance of said capacitor, whereby the voltage of the carrier component developed between cathode and ground is substantially zero, and means to apply the signal voltage appearing at said cathode to the input of said video amplifier.

2. A detector, as set forth in claim 1, wherein said capacitor has a value which combined with said inter-electrode capacitance tunes said inductor to resonance at the frequency of said carrier component.

3. A detector, as set forth in claim 1, further including a resistor connected across said capacitor to provide a direct current path for said diode.

4. A detector, as set forth in claim 1, further including a resistor connected between said cathode and ground to provide a direct current path for said diode.

References Cited in the file of this patent

UNITED STATES PATENTS

| Number | Name | Date |
|---|---|---|
| 1,968,259 | Posthumus | July 31, 1934 |
| 2,034,511 | Farnham | Mar. 17, 1936 |
| 2,235,198 | Buschbeck | Mar. 18, 1941 |
| 2,247,218 | Bratten | June 24, 1941 |